United States Patent [19]

Murphy

[11] 4,213,585
[45] Jul. 22, 1980

[54] MOUNTING SYSTEM FOR A WING MOUNTED AIRCRAFT ENGINE

[75] Inventor: Patrick Murphy, Bellevue, Wash.

[73] Assignee: The Boeing Company, Seattle, Wash.

[21] Appl. No.: 908,074

[22] Filed: May 22, 1978

[51] Int. Cl.$^2$ ............................................. B64D 27/18
[52] U.S. Cl. ...................................... 244/54; 60/39.31; 244/55; 248/554
[58] Field of Search ............... 244/54, 55; 248/5, 554, 248/555; 60/39.31, 226 R

[56] References Cited

U.S. PATENT DOCUMENTS

| | | | |
|---|---|---|---|
| 1,796,765 | 3/1931 | Peterson | 244/55 |
| 1,816,129 | 7/1931 | Sikorsky | 244/54 |
| 2,076,398 | 4/1937 | Carden | 244/55 |
| 2,398,704 | 4/1946 | Gassner | 244/54 |
| 2,815,184 | 12/1957 | Westphal et al. | 244/54 |
| 3,285,538 | 11/1966 | Burnelli | 244/55 |
| 3,831,888 | 8/1974 | Baker et al. | 244/54 |
| 3,848,832 | 11/1974 | Stanley et al. | 244/54 |

FOREIGN PATENT DOCUMENTS

| | | | |
|---|---|---|---|
| 815491 | 7/1938 | France | 244/54 |
| 1328994 | 4/1963 | France | 244/54 |
| 493651 | 10/1938 | United Kingdom | 244/54 |
| 762785 | 12/1956 | United Kingdom | 244/54 |

*Primary Examiner*—Barry L. Kelmachter
*Attorney, Agent, or Firm*—Hughes & Barnard

[57] ABSTRACT

A main engine support structure having a rear portion hinge-mounted at two laterally spaced locations to a leading edge of a wing in a manner to permit limited up and down swing movement of the engine relative to the wing. A generally vertically aligned forward support link connects a forward inboard side portion of the engine support structure to the airplane fuselage, thus providing vertical support for the engine at its forward end. At the rear of the support structure there is a laterally extending link, connecting the support structure to the wing and resisting lateral loads exerted on the engine. This mounting system reliably mounts the engine to the wing, does not interfere with the wing's ability to flex upwardly and downwardly, and properly transmits the loads from the engine into the aircraft structure.

18 Claims, 6 Drawing Figures

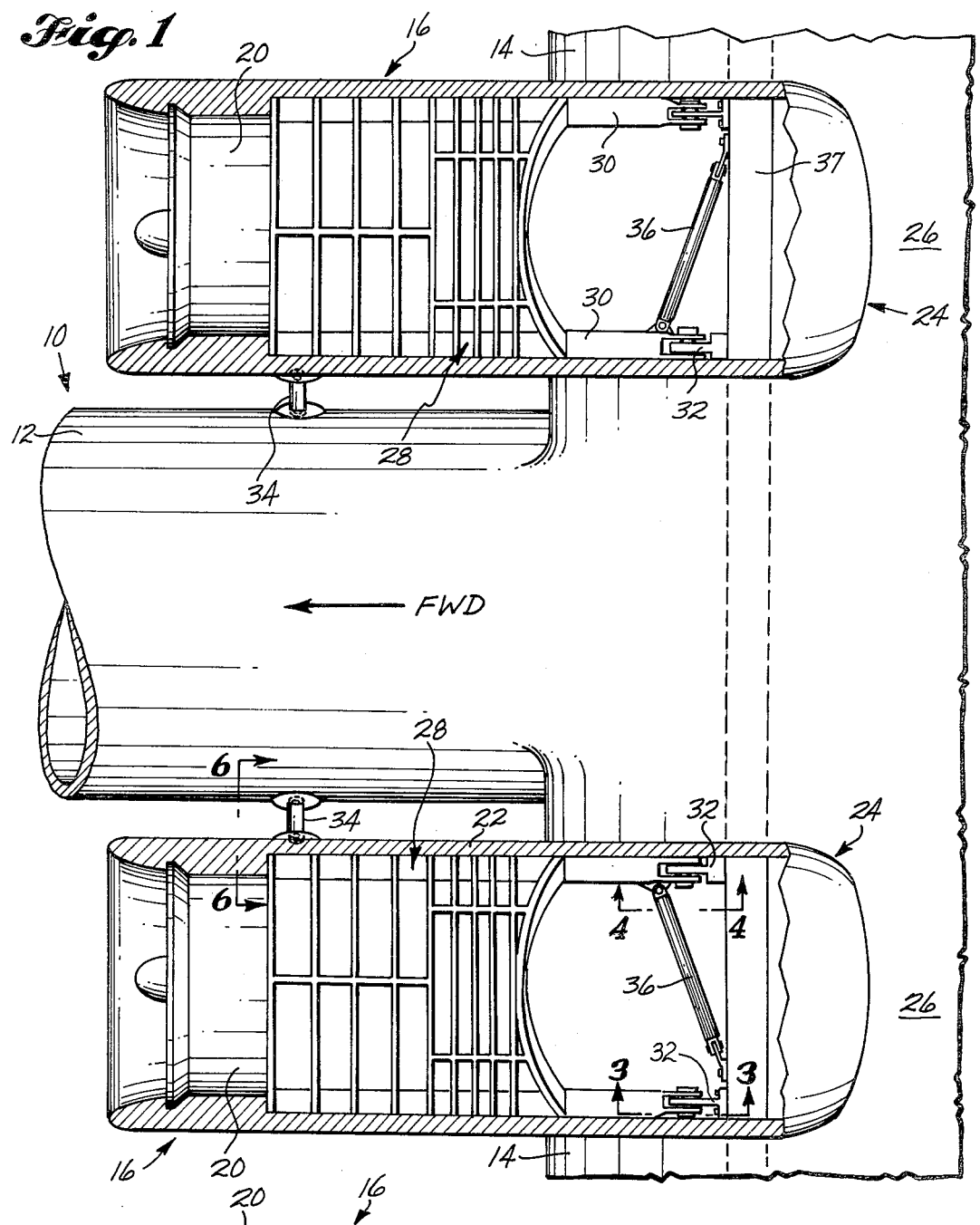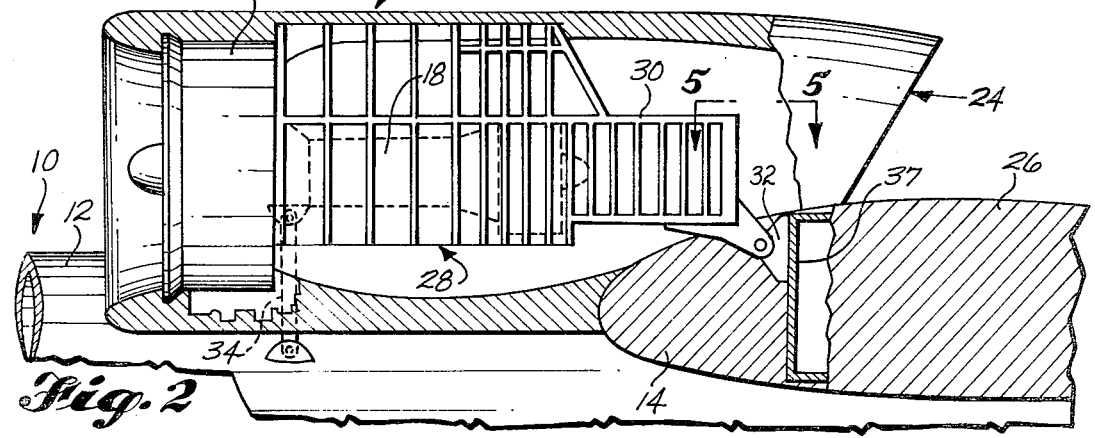

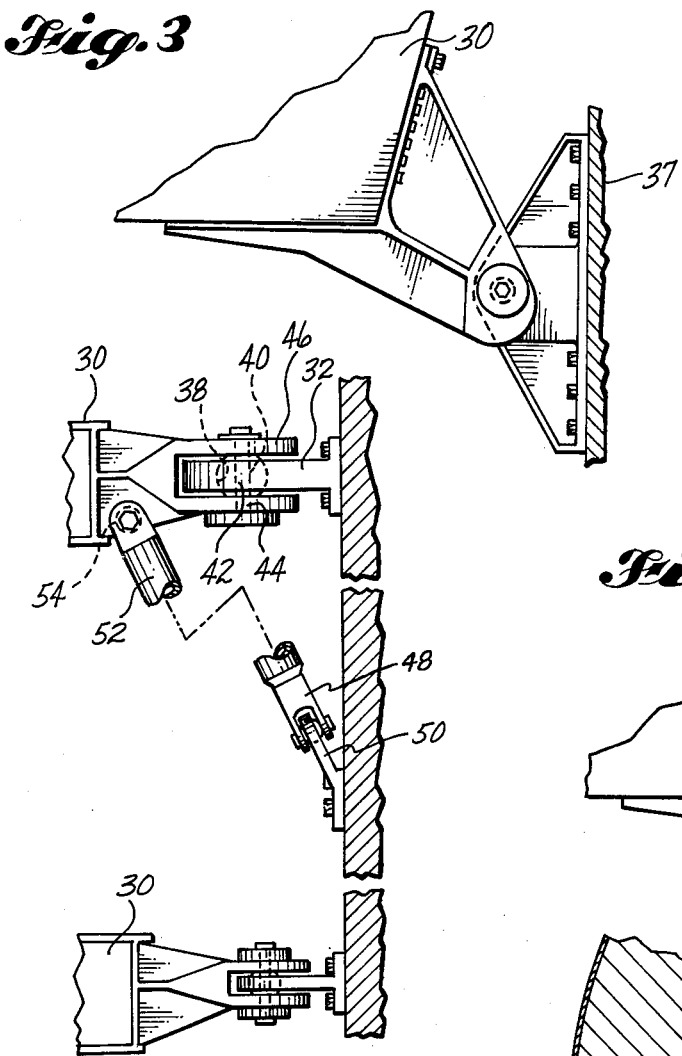
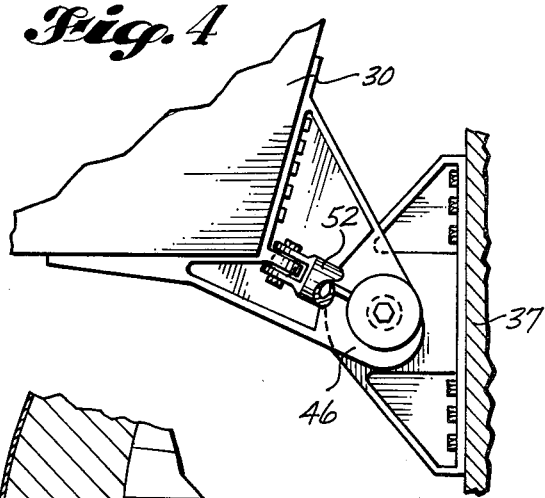
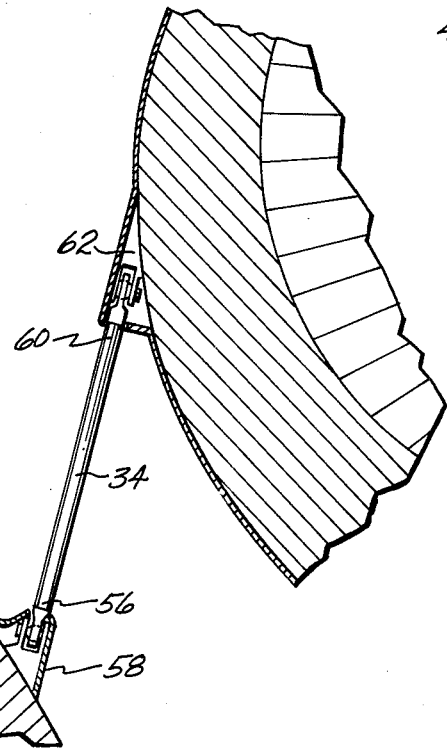

MOUNTING SYSTEM FOR A WING MOUNTED AIRCRAFT ENGINE

BACKGROUND OF THE INVENTION

A. Field of the Invention

The present invention relates to a mounting system for a wing mounted aircraft engine.

B. Brief Description of the Prior Art

In some aircraft designs, the engine or engines of the aircraft are mounted at the leading edge of the wing of the aircraft. The standard approach for mounting such an engine is to cantilever the engine from the front spar of the wing and design the front spar so that it has adequate strength to properly support the engine which extends forwardly therefrom.

An example of this is found in a type of STOL aircraft (i.e. short take-off and landing aircraft) utilizing "upper surface blowing", where the exhaust from the jet engine is directed over the upper surface of the wing. To obtain maximum benefit from this upper surface blowing, the exit nozzle of the engine should be located at a more forward cordwise location (e.g. at approximately the 20% point from the leading edge of the wing). This results in the engine's center of gravity being a considerable distance forward of the front spar to cause rather high moments being transmitted into the spar and other structure of the wing. Another factor which must be taken into consideration in supporting an engine from the wing is that the wing will generally be designed to flex along its length relative to the fuselage. Accordingly, the engine mounting arrangement should not interfere with the ability of the wing to flex, nor place any excessive loads on any of the aircraft components by reason of the wing flexing. It is to these problems that the present invention is directed.

A search of the prior art in the United States patents discloses a number of arrangement for mounting an engine to a wing and/or a fuselage of the aircraft. While none of the patents noted in the search relate directly to the considerations noted above, these patents are believed to be generally representative of various engine mounting arrangements of the prior art.

U.S. Pat. No. 1,796,765, Peterson, discloses an aircraft having a pair of engines mounted moderately below the wing of the aircraft. There are elongate struts connecting the engine to both the wing and the fuselage of the aircraft.

U.S. Pat. No. 1,816,129, Sikorsky, discloses an amphibian-type aircraft where a pair of engines are suspended from an aircraft wing. A plurality of struts form a framework which connects the the engine to the wing.

U.S. Pat. No. 2,076,393, Carden, discloses an aircraft which can function either as a glider (i.e. without power) or as a powered aircraft. An aircraft engine is hinge-mounted at a location above the fuselage. The engine is swung downwardly into a stowed position for gliding, and swung upwardly into the airstream above the aircraft when power from the engine is desired.

U.S. Pat. No. 2,398,704, Gassner, discloses an airplane having a pair of engines mounted at the leading edge of the wing with the nacelles supporting the two engines located beneath the wing. To resist vertical loads, a downwardly and inwardly extending strut is connected from the nacelle to the aircraft fuselage.

U.S. Pat. No. 2,815,184, Westphal et al, shows an aircraft where the engines are suspended from the underside of the body. A number of downwardly extending struts are provided to support the engine in that location.

U.S. Pat. No. 3,285,538, Burnelli, shows an aircraft having four engines mounted forwardly of the aircraft wing, these engines being arranged to discharge their jet exhaust over the upper surface of the wing. The patent states that the engines are supported directly from the body of the aircraft. However, the specific mounting arrangement is not disclosed in any detail.

British patent specification No. 762,785, Chaplin, discloses an aircraft engine connected by a pair of struts connected to both the fuselage and the wing of the aircraft.

French Pat. No. 1,328,994, discloses an aircraft having engines which are hinge-mounted so that the engines can be tilted to direct the exhaust of the engines in a more downward direction.

SUMMARY OF THE INVENTION

The mounting system of the present invention is designed to mount an engine to an aircraft having a fuselage and a wing, with the engine having the rear portion adjacent the wing and the forward portion extending forwardly from the wing and positioned adjacent the fuselage. More particularly the present invention is designed for use with a pair of engines on opposite sides of the fuselage, with each engine comprising a core section and a fan section connected to the front portion of the core section and positioned radially outwardly therefrom, with each engine further having a fan duct cowling extending along and radially outwardly of said engine core to define a fan duct extending to the rear portion of the engine core section.

The mounting apparatus of the present invention comprises a main engine support structure extending along a substantial length of the engine and having a rear portion proximate a leading edge structure of the wing, and a forward portion located forward of the wing adjacent a forward portion of the engine. In a preferred form, this support structure is a generally cylindrical support structure positioned radially outwardly of the core section of the engine and extending along a substantial length of the engine, with the forward portion of the support structure located adjacent the fan section of the engine.

The engine support structure has at its rear portion two laterally spaced mounting members hinge mounted to two laterally spaced hinge mounts on the wing for limited rotation about a horizontally and laterally extending axis of rotation so as to permit limited up and down swing motion of the support structure relative to the wing. There is a generally vertically aligned support link having a first end pivotally connected to the forward portion of the engine main support structure at a third support location and a second end pivotally connected to the fuselage. The support link provides vertical support for the engine at the third location.

With this arrangement the engine is supported from the first, second and third locations so that the wing is able to flex vertically to cause relative rotation between the wing and the engine support structure about the first and second locations, with the support link providing vertical support by transmitting substantially only axial loading into the fuselage.

In a preferred form, the two hinge mounts are arranged relative to the two mounting members to permit limited lateral movement therebetween. The apparatus further comprises a lateral support link interconnecting a rear portion of the engine support structure to the wing to resist lateral movement therebetween. By pivotally connecting the lateral support link to the engine support structure and to the wing structure, the lateral support link does not interfere with the limited rotational movement between the engine support structure and the wing.

In the preferred configuration, the second end of the generally vertically aligned support link is positioned at a lower location where it is connected to the fuselage. The first end of the generally vertically aligned support link is connected to the engine support structure at an upper location so that the vertical support link supports the weight of the engine by compression loading generally along a lengthwise axis of the vertical support link.

In the preferred form of securing each mounting member to its hinge mount, there is provided a ball joint means permitting limited relative rotation between the mounting member and its related hinge mount about axes skewed with respect to the axis of rotation of the engine support structure. Also, each of the mounting members is connected to its related hinge mount by pin means extending between the mounting member and its related hinge mount, with each of these mounting members and its related hinge mount having moderate clearance therebetween to permit relative motion therebetween along the pin means.

Other features of the present invention will become apparent from the following detailed description.

BRIEF DESCRIPTION OF THE DRAWING

FIG. 1 is a top plan view of a portion of an aircraft having two engines mounted in accordance with the teachings of the present invention;

FIG. 2 is a side elevational view, partly in section, of one of the engines of the airplane shown in FIG. 1;

FIG. 3 is a sectional view, drawn to an enlarged scale and taken along line 3—3 of FIG. 1;

FIG. 4 is a sectional view, also drawn to an enlarged scale, taken along line 4—4 of FIG. 1;

FIG. 5 is a sectional view taken from the location of line 5—5 in FIG. 2 and drawn to an enlarged scale;

FIG. 6 is a sectional view drawn to an enlarged scale and taken at line 6—6 of FIG. 1, illustrating a forward support link of the present invention.

DESCRIPTION OF THE PREFERRED EMBODIMENT

In FIG. 1 there is shown an aircraft 10 having a fuselage 12, a wing 14, and a pair of engines 16 mounted to extend forwardly from the leading edge of the wing 12, at a location closely adjacent to and on opposite sides of the fuselage 12. Each engine 16 has a core engine 18 and a fan section 20. Each engine 16 has an outer cowling 22 which extends substantially the entire length of the engine 16. The forward and middle portions of this cowling 22 define the inlet and bypass duct of the engine, and the aft portion defines a mixing area where the exhaust from the core engine 18 and the air from the fan section 20 mix to form a combined jet exhaust. The combined exhuast is discharged from the aft end of the engine at 24 to pass over the upper wing surface 26.

Each engine 16 is provided with a main support structure 28 having a generally cylindrical configuration and being positioned within the outer cowling 22. This support structure 28 has at its rear end two rearwardly extending mounting arms 30, spaced laterally from one another so as to be on opposite sides of the engine 16 at about the mid-height thereof. The forward end of the main support structure 28 extends to the location of the fan section 20, and is connected thereto by suitable means. The core engine 18 and fan section 20 are mounted to the main support structure 28 in such a manner that all of the loads developed by the core engine 18 and the fan section 20 are transmitted directly into the structure 28 which in turn transmits these into the airplane structure. The precise manner in which the core engine 18 and fan section 20 are mounted to the main support structure 28 is not shown here for ease of illustration and does not comprise part of the present invention. The present invention described herein is concerned primarily with the manner in which the main support structure 28 of the engine is itself mounted to the main aircraft structure.

There are four main support members for the structure 28, namely two rear hinge mounts 32, a forward vertical support strut 34, and a rear lateral support link 36.

The two hinge mounts 32 are connected to the forward face of a front spar 37 of the wing 14. Each mount 32 is provided with a laterally aligned opening 38 having a spherically curved surface to receive therein a ball joint element 40. Each ball joint element 40 in turn is provided with a cylindrical through opening 42 to receive a laterally aligned pin 44, with the opposite ends of each pin 44 being secured in a pair of ears 46 at the rear end of a related mounting arm 30 of the supporting structure 28. Thus, it can readily be seen that the main support structure 28 of each engine 16 is hinge mounted for movement about a horizontal transverse axis coincident with the pins 44 of its two related hinge mounts 32.

Each pair of ears 46 is spaced outwardly a short distance from its related ball joint element 40 and from its related hinge mount 32 so that limited lateral movement is permitted between each mounting arm 30 and its related hinge mount 32. Also, each ball joint element 40 permits limited relative rotation between each mounting arm and its related hinge mount 32 about substantially any axis of rotation. Thus, if there is any flexure of the wing section between the two hinge mounts 32 of any one engine, there is sufficient room for lateral and rotational movement between the two mounting arms 30 and their related hinge mounts 32 so as not to tend to restrict the flexure of that wing section.

The aforementioned lateral support link 36 is connected by a first end 48 to a bracket 50 attached to the front spar 37 at a location slightly inboard of its related outer hinge mount 32. The lateral support link 36 has a second end 52 connected to a second bracket 54 which is in turn fixed to the side of its related inboard hinge mount 32 slightly forward of its related hinge pin 44. The first end 48 is mounted in a ball joint for rotation about any axis relative to the lengthwise axis of the spar 37, and the second end 52 is likewise mounted to its related bracket 54 by a ball joint for rotation about any axis. Thus the lateral support links 36 resists lateral movement of the rear end of the main support structure 28, while permitting moderate rotational movement between the main support structure 28 and the front spar 37 at the location of the hinge mounts 32.

The forward support link is best shown in FIG. 6, and can be seen to have a lower end 56 mounted to a lower support bracket 58 fixedly connected to the airplane fuselage 12. The upper end 60 of the vertical support link 34 is connected to an upper support bracket 62 connected to the forward end of the main engine support structure at the inboard side thereof. The upper and lower ends 60 and 56 of the link 34 are each connected to their brackets 62 and 58 by means of a ball joint type connection for rotation about any axis relative to the length of the vertical support link 34. Thus, the two connections of the link 34 permit the link 34 to rotate relative to the fuselage 12 and engine support structure 28 in a manner that it does not restrict relative movement therebetween which could result from the relative rotation of the support structure 28 to the wing 14 during flexure of the wing 14. Thus, the loading on the link 34 is substantially axial loading along its length. While the link 34 is slanted moderately off the vertical, it is substantially vertically aligned.

To describe the functional characteristics of the present invention, since the center of gravity of the engine 16 is on its longitudinal axis at a location approximately midway between two hinge mounts 32 and the forward vertical support link 34, the weight of the engine is supported primarily by the link 34 and the outboard hinge mount 32. The inboard hinge mount 32 provided a third connecting point to provide stability, give some vertical support and prevent any relative rotation of the engine 16 about a line extending from the front support link 34 to the outboard hinge mount 32. The lateral support link 36 connects to the inboard mounting arm 30 at a single location (i.e. the bracket 54) and to the front spar 37 at a single location (i.e. at the bracket 50). This limits lateral movement of the rear end of the support structure 28 relative to the spar 37, while permitting limited lateral and rotational movement between the mounting arms 30 and their hinge mounts 32. Lateral loads exerted on the forward part of the engine 16 are resisted at the two hinge locations at the mount 32.

Let it now be assumed that the airplane 10 is flying with the engines 16 operating to produce a substantial thrust. The thrust of each engine 16 is reacted into its main support structure 28 which in turn reacts the force through the hinge mounts 32 into the front spar 37. Any thermal expansion in the structure 28 is readily accomodated by the spacing of the mounting ears 46 about the hinge mounts 32. In the event that the wing 14 flexes upwardly or downwardly during flight, since the vertical position of the forward end of the support structure 28 is fixed relative to the fuselage by the forward link 34, there will be some relative rotation at the rear end of the structure 28 relative to the front spar 37 at the location of the hinge mounts 32.

Since there may be flexure along the length of the forward spar 37 between two hinge mounts 32 of a support structure 28, the rotation about these hinge mounts 32 may not be uniform. However, as indicated previously herein, because of the ball joint elements 40 and the tolerance between the ears 46 and the hinge mount 32, some lateral movement and rotational movement is permitted so that flexure of the spar 37 at a location between two adjacent hinge mounts 32 is permitted. Since the forward vertical support link 34 is pivot mounted at both of its connections, it exerts only axial loads between the fuselage 12 and the engine structure 28. With the main engine support structure 28 having a substantially rigid generally cylindrical configuration, the off-center vertical force exerted by the forward link 34 does not exert a torsional force into the structure 28 which is beyond the allowable limit.

What is claimed is:

1. In an aircraft having a fuselage, a wing, and at least one engine located adjacent said fuselage, with said at least one engine having a rear portion adjacent said wing and a forward portion extending forwardly from said wing,
   an apparatus to mount said at least one engine to said aircraft, said apparatus comprising:
   a. a main engine support structure extending along a substantial length of said at least one engine and having a rear portion proximate a leading edge structure of said wing and a forward portion located forward of the wing adjacent the forward portion of the at least one engine,
   b. said engine support structure having at its rear portion two laterally spaced mounting members hinge mounted at first and second locations to two laterally spaced hinge mounts on said wing for limited rotation about a horizontally and laterally extending axis of rotation, said engine support structure having no load carrying connection to said wing at any fixed location spaced from said axis of rotation so that said mounting members permit limited up and down swing motion of said support structure relative to said wing,
   c. a generally vertically aligned support link having a first end pivotally connected to the forward portion of the engine main support structure at a third support location and a second end pivotally connected to said fuselage, with said support link providing vertical support for said at least one engine at said third location,
   whereby said at least one engine is supported from said first, second and third locations, with said wing being able to flex vertically to cause relative rotation between the wing and the engine support structure about said first and second locations, with said support link providing vertical support by transmitting substantially only axial loading into said fuselage.

2. The apparatus as recited in claim 1, wherein said two hinge mounts are arranged relative to said two mounting members to permit limited lateral movement therebetween, said apparatus further comprising a lateral support link interconnecting a rear portion of said main engine support structure to said wing to resist lateral movement therebetween.

3. The apparatus as recited in claim 2, wherein said lateral support link is pivotally connected to said engine support structure and to said wing structure to permit limited rotational movement between said engine support structure and said wing.

4. The apparatus as recited in claim 3, wherein the second end of the generally vertically aligned support link is positioned at a lower location where it is connected to said fuselage, and the first end of the generally vertically aligned support link is connected to said engine support structure at an upper location, whereby said generally vertically aligned support link supports weight of said at least one engine by compression loading generally along a lengthwise axis of said generally vertically aligned support link.

5. The apparatus as recited in claim 1, wherein the second end of the generally vertically aligned support link is positioned at a lower location where it is connected to said fuselage, and the first end of the generally vertically aligned support link is connected to said engine support structure at an upper location, whereby said generally vertically aligned support link supports weight of said at least one engine by compression loading generally along a lengthwise axis of said generally vertically aligned support link.

6. The apparatus as recited in claim 1, wherein each of said mounting members is connected to its related hinge mount by ball joint means permitting limited relative rotation between said mounting member and its related hinge mount about axes skewed with respect to the axis of rotation of the engine support structure.

7. The apparatus as recited in claim 6, wherein each of said mounting members is connected to its related hinge mount by pin means extending between said mounting member and its related hinge mount, with each of said mounting members and its related hinge mount having moderate clearance therebetween to permit relative motion therebetween along said pin means.

8. The apparatus as recited in claim 1, wherein each of said mounting members is connected to its related hinge mount by pin means extending between said mounting member and its related hinge mount, with each of said mounting members and its related hinge mount having moderate clearance therebetween to permit relative motion therebetween along said pin means.

9. The apparatus as recited in claim 1, wherein:
 a. said two hinge mounts are arranged relative to said two mounting members to permit limited lateral movement therebetween, said apparatus further comprising a lateral support link interconnecting a rear portion of said main engine support structure to said wing to resist lateral movement therebetween,
 b. said lateral support link is pivotally connected to said engine support structure and to said wing structure to permit limited rotational movement between said engine support structure and said wing,
 c. the second end of the generally vertically aligned support link is positioned at a lower location where it is connected to said fuselage, and the first end of the generally vertically aligned support link is connected to said engine support structure at an upper location, whereby said generally vertically aligned support links supports weight of said at least one engine by compression loading generally along a lengthwise axis of said generally vertically aligned support link,
 d. each of said mounting members is connected to its related hinge mount by ball joint means permitting limited relative rotation between said mounting member and its related hinge mount about axes skewed with respect to the axis of rotation of the engine support structure, and
 e. each of said mounting members is connected to its related hinge mount by pin means extending between said mounting member and its related hinge mount, with each of said mounting members and its related hinge mount having moderate clearance therebetween to permit relative motion therebetween along said pin means.

10. In an aircraft having a fuselage, a wing, and at least two engines located adjacent said fuselage on opposite sides thereof, each engine having a rear portion adjacent said wing and a forward portion extending forwardly from said wing, each engine comprising a core section and a fan section connected to the front portion of the core section and positioned radially outwardly therefrom, each engine further having a fan duct cowling extending along and radially outwardly of said core section to define a fan duct extending to the rear portion of the core section,
 a first and second apparatus to mount said engines to said aircraft, each apparatus comprising:
 a. a generally cylindrical engine support structure positioned radially outwardly of said core section and extending along a substantial length of said engine, said engine support structure having a rear portion proximate a leading edge structure of the wing and a forward portion located forward of the wing and adjacent said fan section of the engine,
 b. said engine support structure having at its rear portion two laterally spaced mounting members hinge mounted at first and second locations to two laterally spaced hinge mounts on said wing for limited rotation about a horizontally and laterally extending axis of rotation, said engine support structure having no load carrying connection to said wing at any fixed location spaced from said axis of rotation so that said mounting members permit limited up and down swing motion of said support structure relative to said wing,
 c. a generally vertically aligned support link having a first end pivotally connected to the forward portion of the engine main support structure at a third support location and a second end pivotally connected to said fuselage, with said support link providing vertical support for said engine at said third location,
whereby each engine is supported from said first, second and third locations, with said wing being able to flex vertically to cause relative rotation between the wing and each engine support structure about said first and second locations, with said support link providing vertical support by transmitting substantially only axial loading into said fuselage.

11. The apparatus as recited in claim 10, wherein said two hinge mounts are arranged relative to said two mounting members to permit limited lateral movement therebetween, said apparatus further comprising a lateral support link interconnecting a rear portion of said main engine support structure to said wing to resist lateral movement therebetween.

12. The apparatus as recited in claim 11, wherein said lateral support link is pivotally connected to said engine support structure and to said wing structure to permit limited rotational movement between said engine support structure and said wing.

13. The apparatus as recited in claim 12, wherein the second end of the generally vertically aligned support link is positioned at a lower location where it is connected to said fuselage, and the first end of the generally vertically aligned support link is connected to said engine support structure at an upper location, whereby said generally vertically aligned support link supports weight of said engine by compression loading generally along a lengthwise axis of said generally vertically aligned support link.

14. The apparatus as recited in claim 10, wherein the second end of the generally vertically aligned support link is positioned at a lower location where it is connected to said fuselage, and the first end of the generally vertically aligned support link is connected to said engine support structure at an upper location, whereby said generally vertically aligned support link supports weight of said engine by compression loading generally along a lengthwise axis of said generally vertically aligned support link.

15. The apparatus as recited in claim 10, wherein each of said mounting members is connected to its related hinge mount by ball joint means permitting limited relative rotation between said mounting member and its related hinge mount about axes skewed with respect to the axis of rotation of the engine support structure.

16. The apparatus as recited in claim 15, wherein each of said mounting members is connected to its related hinge mount by pin means extending between said mounting member and its related hinge mount having moderate clearance therebetween to permit relative motion therebetween along said pin means.

17. The apparatus as recited in claim 10, wherein each of said mounting members is connected to its related hinge mount by pin means extending between said mounting member and its related hinge mount, with each of said mounting members and its related hinge mount having moderate clearance therebetween to permit relative motion therebetween along said pin means.

18. The apparatus as recited in claim 10, wherein:
   a. said two hinge mounts are arranged relative to said two mounting members to permit limited lateral movement therebetween, said apparatus further comprising a lateral support link interconnecting a rear portion of said main engine support structure to said wing to resist lateral movement therebetween,
   b. said lateral support link is pivotally connected to said engine support structure and to said wing structure to permit limited rotational movement between said engine support structure and said wing,
   c. the second end of the generally vertically aligned support link is positioned at a lower location where it is connected to said fuselage, and the first end of the generally vertically aligned support link is connected to said engine support structure at an upper location, whereby said generally vertically aligned support links supports weight of said engine by compression loading generally along a lengthwise axis of said generally vertically aligned support link,
   d. each of said mounting members is connected to its related hinge mount by ball joint means permitting limited relative rotation between said mounting member and its related hinge mount about axes skewed with respect to the axis of rotation of the engine support structure, and
   e. each of said mounting members is connected to its related hinge mount by pin means extending between said mounting member and its related hinge mount, with each of said mounting members and its related hinge mount having moderate clearance therebetween to permit relative motion therebetween along said pin means.

* * * * *